United States Patent [19]

Dreisbach et al.

[11] 4,234,254
[45] Nov. 18, 1980

[54] UNIT FOR MEASURING PLANENESS

[75] Inventors: Bodo Dreisbach, Bad Toelz; Karl Eidling, Egling, both of Fed. Rep. of Germany

[73] Assignee: Siemens Aktiengesellschaft, Berlin & Munich, Fed. Rep. of Germany

[21] Appl. No.: 18,184

[22] Filed: Mar. 7, 1979

[30] Foreign Application Priority Data

Mar. 10, 1978 [DE] Fed. Rep. of Germany ....... 2810512

[51] Int. Cl.$^3$ .............................................. G01B 9/02
[52] U.S. Cl. ..................................... 356/244; 356/352
[58] Field of Search ................ 356/244, 352, 357, 358, 356/363

[56] References Cited

U.S. PATENT DOCUMENTS

| 2,820,298 | 1/1958 | Bendt | 356/357 X |
| 3,045,535 | 7/1962 | Jacquinot et al. | 356/352 |
| 3,537,798 | 11/1970 | Taft et al. | 356/352 |
| 3,891,320 | 6/1975 | Kimura et al. | 356/352 |

FOREIGN PATENT DOCUMENTS 712930  8/1954  United Kingdom .

Primary Examiner—John K. Corbin
Assistant Examiner—Matthew W. Koren
Attorney, Agent, or Firm—Hill, Van Santen, Steadman, Chiara & Simpson

[57] ABSTRACT

A unit for use with an interferometer for measuring the planeness of thin, stiff disks and has asuction means for maintaining the disks in flat abutment with an equalizer plate which is adjustable by means of micrometer spindles to move an opposite side of the disk into flat abutment with a reference plate. The equalizer plate, spindles and suction grid are supported on a base plate which is axially rotatable about a column for movement from underneath the reference plate to place the disks on the suction grid. A clamping means is provided around the column to hold the assembly in a fixed, rigid position.

6 Claims, 2 Drawing Figures

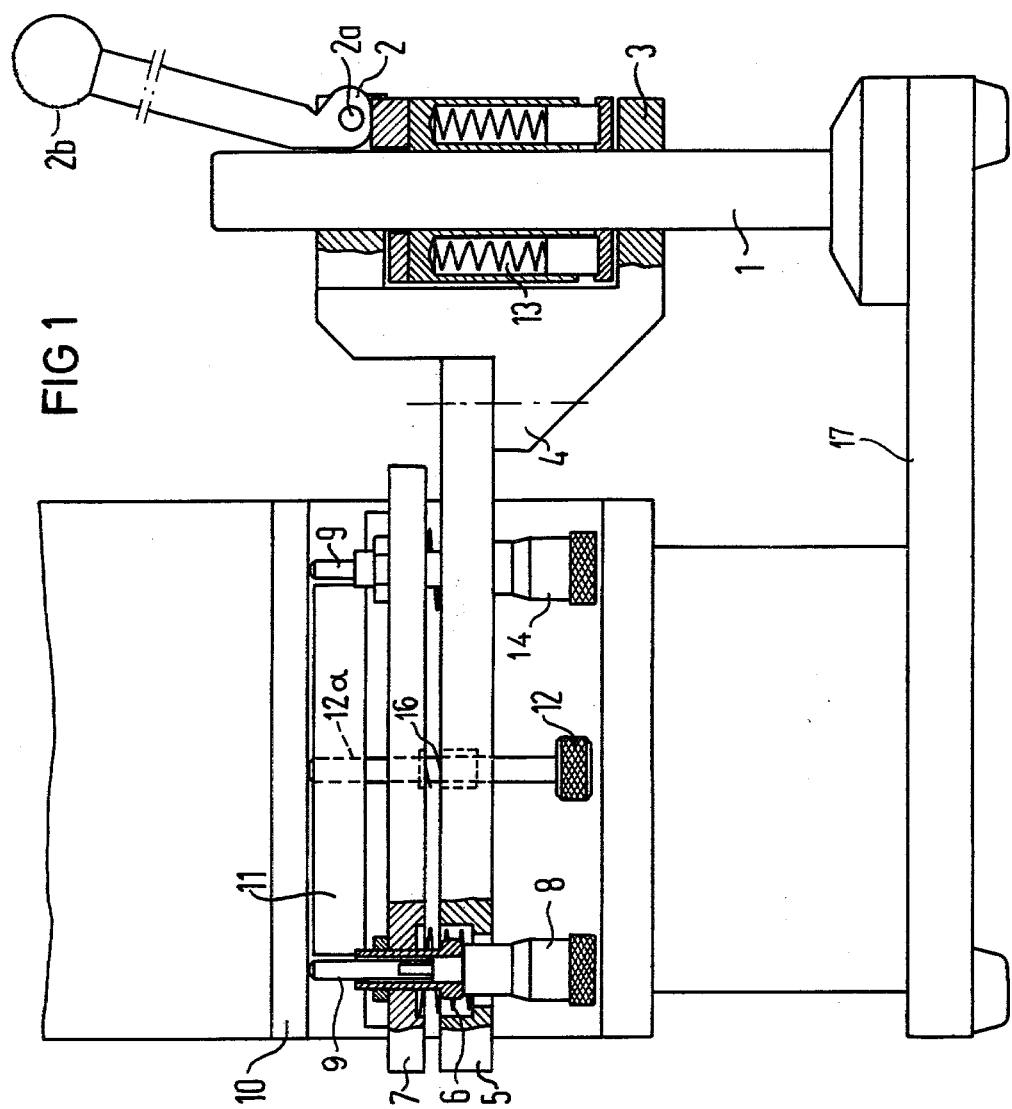

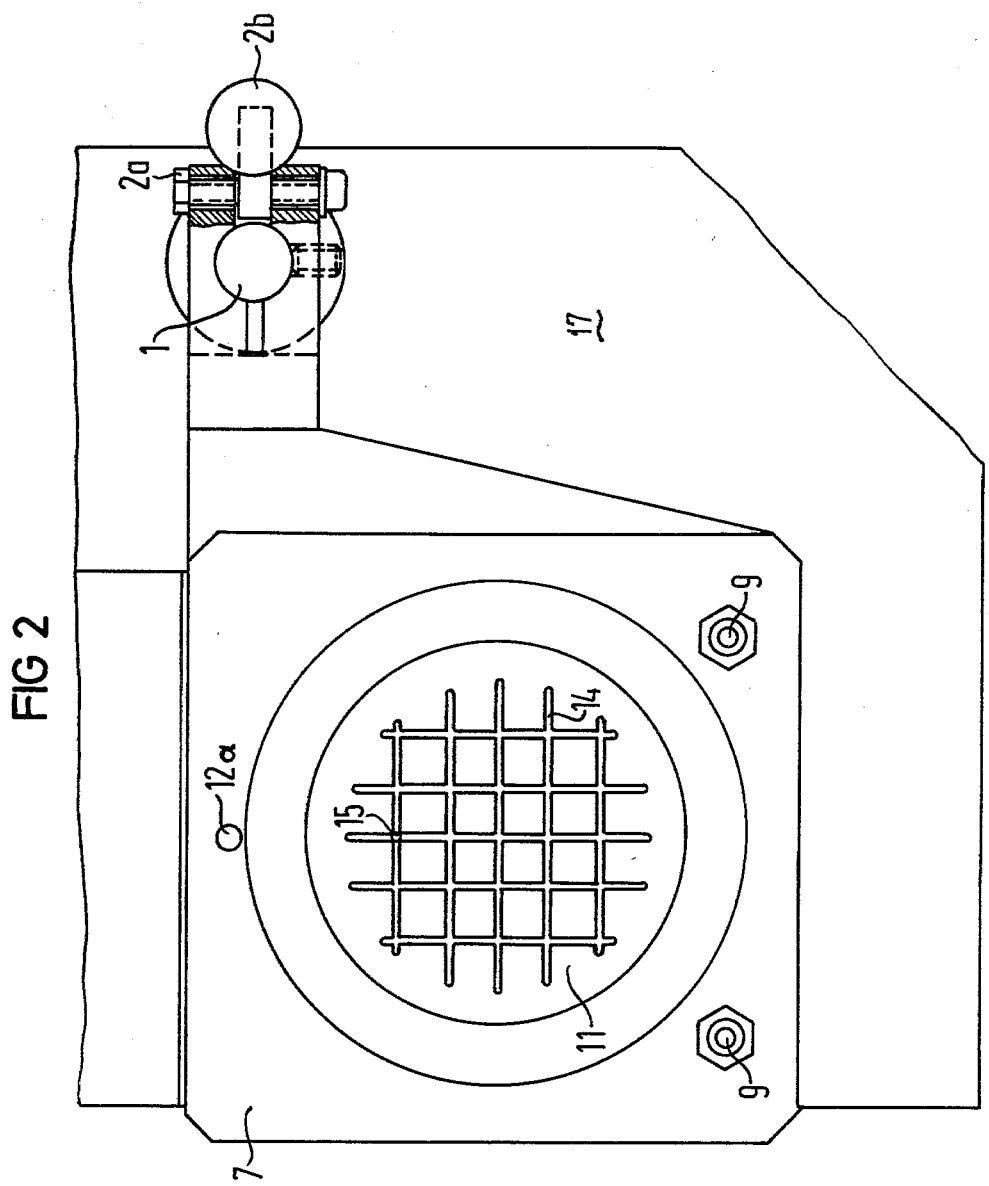

UNIT FOR MEASURING PLANENESS

BACKGROUND OF THE INVENTION

1. Field of the Invention

The present invention relates to a unit for use with an interferometer for measuring the planeness of thin items.

2. Description of the Prior Art

Items such as thin, stiff disks are frequently contemplated for use in environments in which opposite faces of the disks must be parallel within specified tolerances. An example of such an item is a silicon disk, used widely in various electronic applications. Quality control of such mass produced disks requires a means for determining whether such disks are within the required specified degree of parallelness or planeness. This property is measured by arbitrarily assigning a value of zero to the distance between faces at one edge of the disk, and using that reference to measure deviations therefrom along the length of one of the faces. Such deviations are known as the "wedge error".

Until recently, silicon disks with a wedge error of less than 6 $\mu$m were not available. The best suctions plates for use with interferometers for measuring the wedge error of such disks had inherent wedge errors of greater than 1.5 $\mu$m in the suction plates themselves. Use of such units to measure wedge errors of less than 6 $\mu$m is not possible, because the wedge error inherent in the suction plate itself is a substantial percentage of the wedge error to be measured.

Another problem in the art resulting in imprecise measurement of wedge errors of less than 6 $\mu$m is that conventional suction plates for holding such disks frequently result in the movement of air causing the suction plate to oscillate out of phase with the measuring apparatus, thereby resulting in incorrect interferometer readings.

SUMMARY OF THE INVENTION

In accordance with the present invention, a suction plate with suction channels and vacuum bores is utilized having a surface that is plane within 2 $\mu$m. Disks to be measured may be simply placed on the suction plate, or held thereon by operation of suction.

Wedge error compensation is obtained by means of a 3-point support of a base plate with respect of a reference plate of the measuring apparatus. The 3-point support consists of one rigid and two adjustable point supports utilizing micrometer spindles.

A height adjustable swivel device pivotable about a vertical axis and clampable on the axis is used to move the suction plate and 3-point supports beneath the reference plate, and allows use of the suction plate with test pieces of various thicknesses. Sliding of the test piece underneath the measuring apparatus during the testing procedure is prevented by clamping.

BRIEF DESCRIPTION OF THE DRAWINGS

FIG. 1 is an elevational view of a unit for measuring the planeness of thin items.

FIG. 2 is a plan view of the unit of FIG. 1.

DESCRIPTION OF THE PREFERRED EMBODIMENT

A unit for use with an interferometer for measuring the planeness of thin items is shown in FIG. 1. The unit consists of an upright column 1 mounted on a base 17. The column 1 extends through a bore in a swivel device 3. The swivel device 3 can be lifted and clamped with respect to the column 1 by means of a cam 2 rotating on a clamping screw 2a. The cam 2 is moved by a handle 2b for selected height adjustment of the swivel device on the column 1. The movement of the cam 2 actuates a clamping device 13 to maintain the swivel device 3 in a fixed position on the column 1 after such a position has been selected.

An arm 4 of the swivel device 3 supports a base plate 5 having a plurality of adjustment means 8, 12 and 14 mounted therein. A description of the adjustment means 8 is as follows, however, it will be understood that the structure of the adjustment means 14 is identical.

The adjustment means 8 is threaded as a micrometer (threads not shown) for movement of a spindle 9. The adjustment means 8 is mounted in the base plate 5 by means of a spring 6 having a bottom resting in a recess in the base plate 5 and a top abutting a corresponding recess in an equalizer plate 7 disposed above and generally parallel to the base plate 5. An uppermost end of the spindle 9 abuts a flat reference plate 10.

The adjustment means 12 is not calibrated as a micrometer, and is simply threaded in the base plate 5 (threads not shown). The adjustment means 12 is also surrounded by a spring 16 carried in recesses in the base plate 5 and the equalizer plate 7.

A suction plate 11 is rigidly connected to the equalizer plate 7 in parallel fashion. As shown in FIG. 2, the suction plate 11 has a plurality of suction channels 14 on a top surface thereof, forming a suction grid. Suction is applied to the grid by means of a suction bore, shown at 15, and a vacuum means not shown. The springs 6 and 16 allow movement of the equalizer plate 7 and the attached suction plate 11 with respect to the base plate 5. Such movement is accomplished as described below.

In order to prepare the suction plate to measure an item to be tested, the base plate 5 is lowered by means of the lifting cam 2 and pivoted out of the measuring device on the column 1. A wafer is placed on the suction surface 11 and attached by suction with the aid of a vacuum. The base plate 5 can then be pivoted beneath the reference plate 10 of the measuring apparatus and lifted by the lifting cam 2. Such lifting simultaneously clamps the swivel device 3 on the column 1 in the selected position.

The two spindles 9 and the spindle 12a are pressed against the reference plate 10 by the coil springs 6 and 16 and thus are frictionally connected therewith. This insures that the measuring apparatus and suction plate will oscillate in phase so that the measuring result is not influenced by building oscillations caused by the air movement. Alternatively, such connnection can also be accomplished by means of magnets instead of the use of springs.

The surface of the wafer must be adjusted parallel to the reference plate 10 to measure the wedge error. The wedge error will be the angle between the item tested and the reference plate. The micrometer adjustment means 8 and 14 allow adjustment for measurement of a wedge error down to 0.5 $\mu$m. The other adjustment means 12 can be adjusted to allow for measurement of items of varying thicknesses, however, once the testing procedure has begun, the adjustment means 12 is not moved.

As the position of the spindles 9 and 12 relative to the wafer is retained unchanged even when lowering the base plate 5, the wedge error is thus also unchanged when the base plate is pitoved under the reference plate of a different measuring apparatus, thereby allowing use of this same unit for comparative purposes with different measuring devices.

Preferably the suction plate 11 is comprised of glass, quartz or silicon oxide or of materials with similar abrasive properties. Such a suction plate can be polished to a planeness of less than 0.1 $\mu$m by the use of known optical polishing methods.

Although various minor modifications may be suggested by those versed in the art, it is the Inventors' intention to embody within the patent warranted here on all such changes and modifications as reasonably and properly come within the scope of their contribution to the art.

Only reference plate 10 of the measuring device of the already known interferometer is shown. The interferometer and swivel device 3 are both mounted on base 15. The measurement is made in the usual way, i.e. half the coherent light is reflected from reference plate 10 and half from silicon wafer 11. The resulting phase difference produces the interference fringes used for taking the measurements.

I claim as my invention:

1. A device for use with an interferometer for measuring the planeness of thin, stiff disks comprising:
   a suction plate having suction channels connected to a vacuum source and area thereon for holding items to be measured by means of suction;
   a reference plate disposed above said suction plate;
   a swivel means for moving said suction plate beneath said reference plate; and
   adjustment means for moving said suction plate to a desired angle beneath said reference plate.

2. The device of claim 1 wherein said suction plate is comprised of a material selected from the group of glass, quartz and silicon oxide.

3. The device of claim 1 wherein said suction plate is moved with respect to said reference plate by means of selected movement of three threaded spindles attached to said suction plate and movable with respect to said reference plate.

4. The device of claim 1 wherein two of said spindles are micrometer spindles.

5. The device of claim 1 wherein said swivel means can be adjusted as to height with respect to a vertical column and can be simultaneously clamped to said column.

6. A device for use with an interferometer for measuring the planeness of thin, stiff disks comprising:
   a base, a vertical column mounted on said base, a swivel means rotatable about said column and vertically movable with respect thereto and clampable thereto;
   a base plate attached to said swivel means for perpendicular extension with respect to said vertical column;
   an equalizer plate disposed above and generally parallel to said base plate;
   two micrometer adjustable spindles extending through said base plate and said equalizer plate, each of said spindles surrounded by a spring having a bottom portion received in a recess in said base plate and an upper portion received in a corresponding recess in said equalizer plate;
   a threaded spindle extending through said base plate and said equalizer plate and surrounded by a spring having a lower portion received in a recess in said base plate and an upper portion received in a recess in said equalizer plate;
   a suction plate rigidly mounted on said equalizer plate having an upper flat surface having a plurality of suction grooves thereon on which an object to be measured is placed, said suction grooves being connected to a vacuum means; and
   a reference plate disposed above said suction plate, against which said micrometer adjustable spindles and said threaded spindles abut, whereby selected adjustment of said swivel means with respect to said vertical column and said micrometer adjustable spindles will result in said suction plate assuming a measurable angle with respect to said reference plate.

* * * * *